2 Sheets—Sheet 1.

W. T. HILDRUP & A. TSCHOP.
Guano Sower and Seeder Combined.

No. 231,669. Patented Aug. 31, 1880.

Witnesses:
Inventors

2 Sheets—Sheet 2.

W. T. HILDRUP & A. TSCHOP.
Guano Sower and Seeder Combined.

No. 231,669. Patented Aug. 31, 1880.

Witnesses: Inventors.

UNITED STATES PATENT OFFICE.

WILLIAM T. HILDRUP AND ALBERT TSCHOP, OF HARRISBURG, PA.

GUANO-SOWER AND SEEDER COMBINED.

SPECIFICATION forming part of Letters Patent No. 231,669, dated August 31, 1880.

Application filed March 19, 1880. (Model.)

*To all whom it may concern:*

Be it known that we, ALBERT TSCHOP and WILLIAM T. HILDRUP, citizens of the United States, residing at Harrisburg city, county of Dauphin, and State of Pennsylvania, have invented new and useful Improvements in Guano-Sower and Seeder Combined; and we do hereby declare the following to be an exact description of the same, reference being had to the accompanying drawings, and to the letters of reference marked thereon, making part of this specification, in which—

Figure 1:
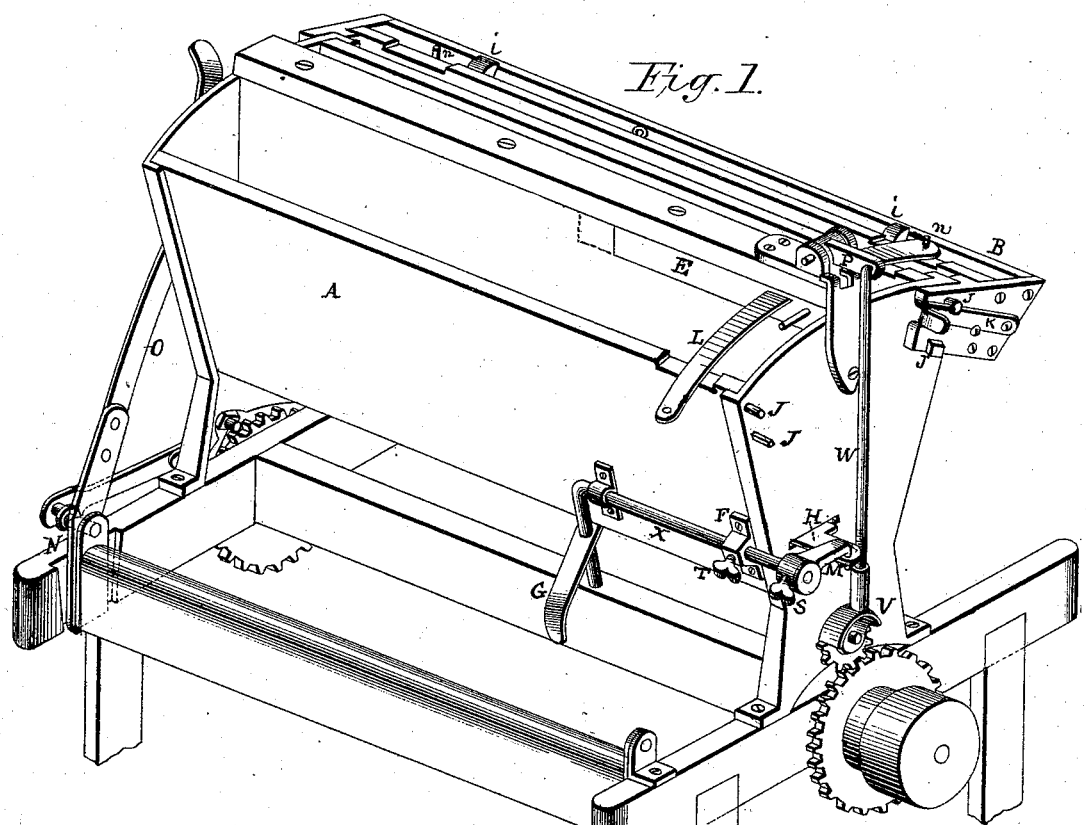
Figure 3:
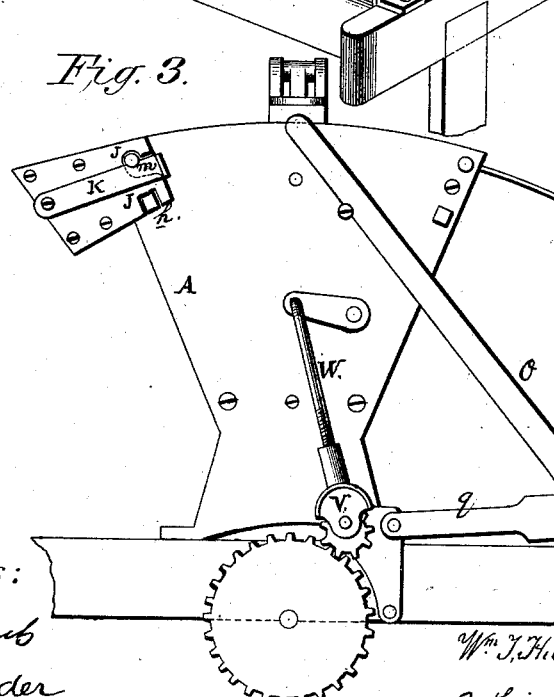
Figure 2:
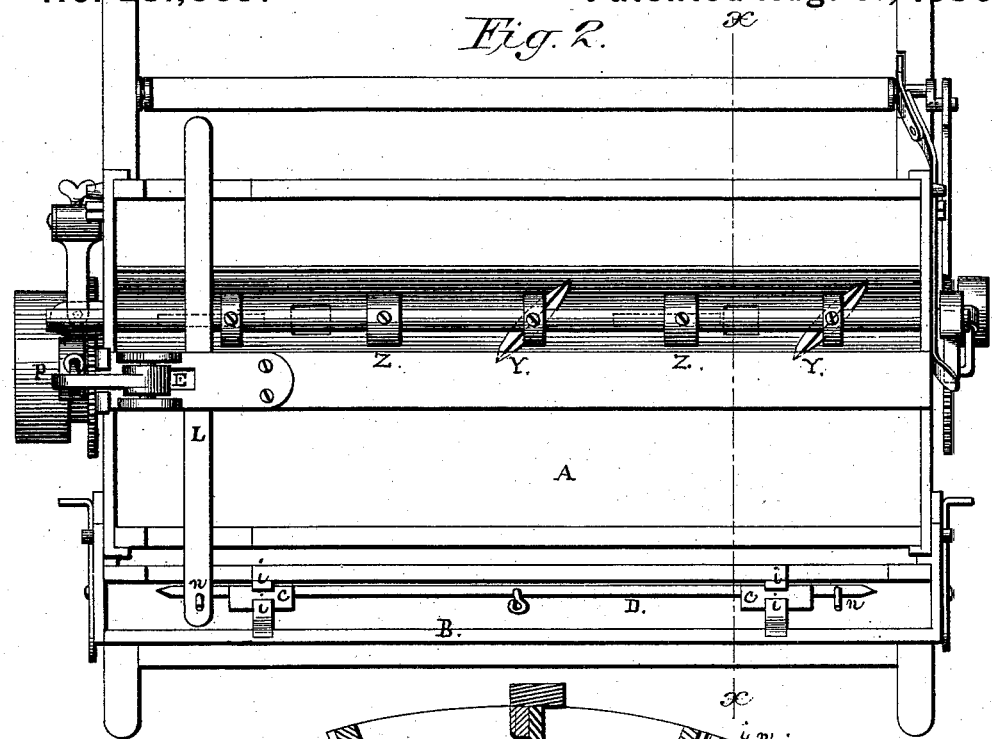
Figure 4:
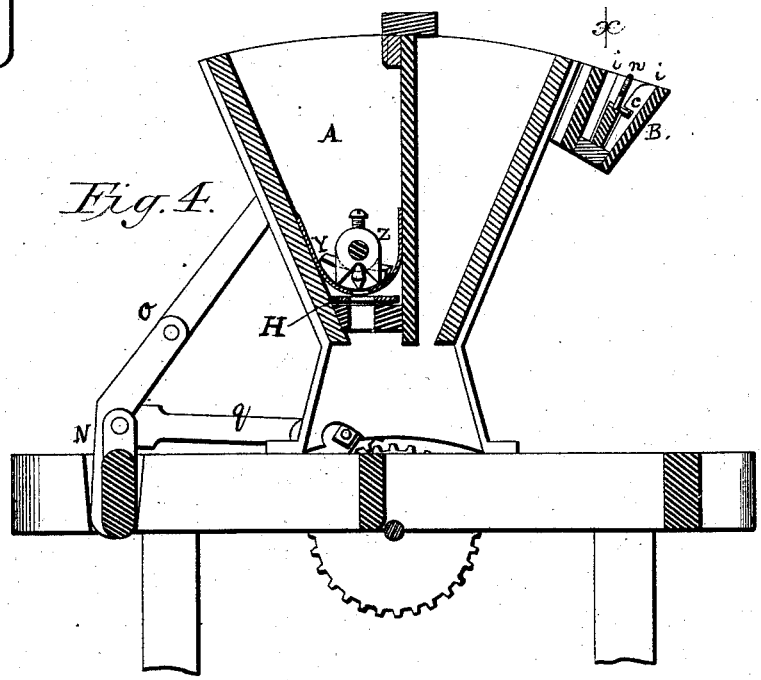

Figure 1 represents a perspective view of the guano-sower and seeder combined. Fig. 2 represents a top view of the same. Fig. 3 shows an end elevation of the same, and Fig. 4 a cross-section.

The nature of our invention consists in the construction of the end plate for holding the seeding-hopper to the guano-hopper. The object is to sow guano and seeds at the same operation.

The guano is put into the box or hopper A, having a round sheet-iron bottom, with openings or apertures for the guano to drop through, and motion is given to the series of agitators Z and Y, keeping the guano loose and working it through the discharge-openings by the traction or ordinary carriage wheels. (Not shown in drawings.) The gear running the agitators or stirrers can be thrown in or out of gear at will by the operator without stopping any other part of the machinery. At the ends of the field, while turning around, the ordinary teeth or shovels can be lifted by a lever, as common to all seeding-machines.

The little or seed hopper B, to sow the grass-seed, is hung on, either in the rear or front of large hopper A, without any tools whatever, and carries no extra part. The ends of hopper B have metallic plates, with one square notch, h, in the lower side of the plate, and a curved notch, m, in the end of the plate, to lap, fit over, and rest upon the lugs or projections J J, held and fastened by a flat spring, K. This is a useful improvement, as farmers have heretofore been compelled to carry a variety of tools and extra parts. To change seed-hopper B, by lifting spring L and pushing wooden slide D in the seed-hopper toward one end it can be taken out and the seed-hopper cleaned, which is also a useful improvement.

There are flat springs K at the ends of seed-hopper B, which keep it from detaching from the machine. To make a change, all that is required is to lift the springs K and push them down, and the hopper B can be lifted off the lugs J J.

$i\ i$ are upright guides on each side of the slide D in hopper B, with plates C C to preserve a regular agitation of the seed.

The guano is fed through a round sheet-iron bottom by three prongs or stirrers, Z, the middle one being longer than the outside ones, and runs parallel with the bottom, while in between the discharge-openings is a single stirrer, Y, set to an angle, which works the guano right and left toward the openings, which are new and useful improvements.

There is an iron slide, H, running underneath the bottom of the hopper A, with oblong openings to regulate the quantity of guano to be sown to an acre. Said slide runs through one end of the hopper, which allows it to be easily taken out and cleaned—a decided advantage. To remove said slide H loosen thumb-screw S and turn arm M up, and the slide can be drawn out without using any tools. To set the quantity of guano, loosen thumb-screw T and push handle G, and fasten with screw again. The square box F is attached to one end of the hopper A, with the adjustable thumb-screw T to tighten the adjustable horizontal rod X after regulating the openings in the slide H.

The sliding block E is fastened to the arm or cross-spring L, and extends across the hopper A, and has holes in each end to receive and hold the stud or pin n, that is attached to the slide D.

The arm P, at one end of hopper A, is an ordinary pivoted arm, to which the upright rod W is suspended. The arm P, as a lever, moves the sliding block E and spring L back and forth, whereby the slide D of the grass-seeder B is simultaneously moved with the slide H of hopper A. The stirrers Z and Y are at the same time operated by the gearing attached to the movable boxes V, which is operated by the revolution of ordinary traction-wheels.

The standard N is riveted or fastened to lever O, and pivoted at the lower end on the frame, and is combined with the connecting-link or pitman q, for the purpose of throwing the machine in or out of gear.

The guano and grass-seed machinery is run by cranks, which carry boxes V below, into which holes are drilled, and threads cut into them to receive connecting-rods W, which is new and an advantage, as the rod can be lengthened or shortened. Said boxes V have a flange or cover extending over them, which protects the oil-holes from dirt.

What we claim as our invention, and desire to secure by Letters Patent, is—

The combination and construction of the ends of seed-box B to lap over the upper corner of the large hopper A, with the flat springs K and lugs J J to keep the seed-box B from dropping off, as herein described, and for the purposes set forth.

W. T. HILDRUP.
ALBERT TSCHOP.

Witnesses:
C. CARROLL CHARLES,
D. A. KEPNER,
R. P. CADOU.